(12) United States Patent
Choi

(10) Patent No.: US 6,796,709 B2
(45) Date of Patent: Sep. 28, 2004

(54) TURBINE BLADE (BUCKET) HEALTH MONITORING AND PROGNOSIS USING INFRARED CAMERA

(75) Inventor: Sukhwan Choi, Greenville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/300,610

(22) Filed: Nov. 21, 2002

(65) Prior Publication Data

US 2004/0101023 A1 May 27, 2004

(51) Int. Cl.$^7$ .............................. G01K 1/12; G01J 5/08
(52) U.S. Cl. ................... 374/102; 374/124; 374/144; 374/57; 702/184; 415/118; 416/61
(58) Field of Search ................ 374/102, 124, 374/141, 144, 4, 5, 45, 57, 120, 121; 250/341.6; 415/118; 416/61; 702/184

(56) References Cited

U.S. PATENT DOCUMENTS

| | | | |
|---|---|---|---|
| 3,855,864 A | * 12/1974 | Douglas | 374/107 |
| 4,818,118 A | * 4/1989 | Bantel et al. | 374/7 |
| 5,033,010 A | * 7/1991 | Lawrence et al. | 374/102 |
| 5,100,111 A | 3/1992 | Thomas | 266/88 |
| 5,111,048 A | * 5/1992 | Devitt et al. | 374/5 |
| 5,203,632 A | * 4/1993 | Fisher et al. | 374/144 |
| 5,211,007 A | 5/1993 | Marvin | 60/204 |
| 5,305,599 A | 4/1994 | Marvin | 60/226.3 |
| 5,348,395 A | 9/1994 | Corr, II et al. | 374/135 |
| 5,421,652 A | 6/1995 | Kast et al. | 374/208 |
| 5,735,666 A | 4/1998 | Johnston | 415/34 |
| 6,109,783 A | * 8/2000 | Dobler et al. | 374/131 |
| 6,195,624 B1 | * 2/2001 | Woodman et al. | 702/34 |
| 6,353,815 B1 | * 3/2002 | Vilim et al. | 706/15 |
| 6,364,524 B1 | * 4/2002 | Markham | 374/144 |
| 6,422,743 B1 | * 7/2002 | Nirmalan et al. | 374/43 |
| 6,425,241 B1 | 7/2002 | Jones et al. | 60/803 |
| 6,579,005 B2 | * 6/2003 | Ingallinera | 374/45 |
| 2003/0037606 A1 | * 2/2003 | Bernhardi et al. | 73/116 |

OTHER PUBLICATIONS

Hoeft and Gebhardt, "Heavy–Duty Gas Turbine Operating and Maintenance Considerations," GE Energy Services product pamphlet No. GER–3620F (1998) (No Month) pp. 1–31.*

"Transient Themographic NDE of Turbine Blades", X. Maldague, P. Cielo, D. Poussart, D. Craig and R. Bourret, SPIE vol. 1313 Thermosense XII (1990), pp. 161–171.*

* cited by examiner

Primary Examiner—Diego Gutierrez
Assistant Examiner—Stanley J. Pruchnic, Jr.
(74) Attorney, Agent, or Firm—Nixon & Vanderhye P.C.

(57) ABSTRACT

An infrared camera is configured to measure a temperature distribution on a surface of at least one rotating turbine bucket. With the measured surface temperature distribution, a condition index is determined which reflects either an overall condition of a bucket or a specific location on the bucket. The condition index can be used to predict the remaining useful life of a turbine bucket, which can be used to optimize maintenance intervals and thereby reduce maintenance costs.

7 Claims, 3 Drawing Sheets

Schematic diagram of bucket health monitoring system

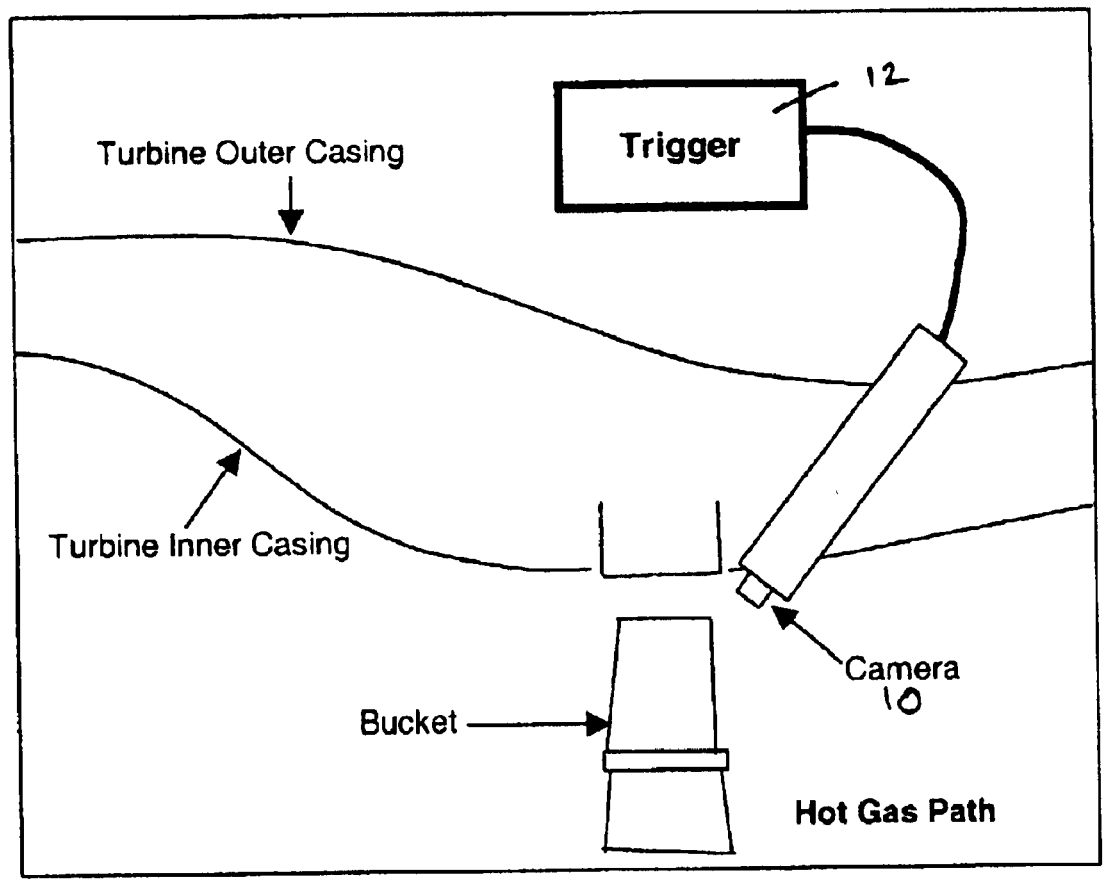
Figure 1. – Schematic diagram of bucket health monitoring system

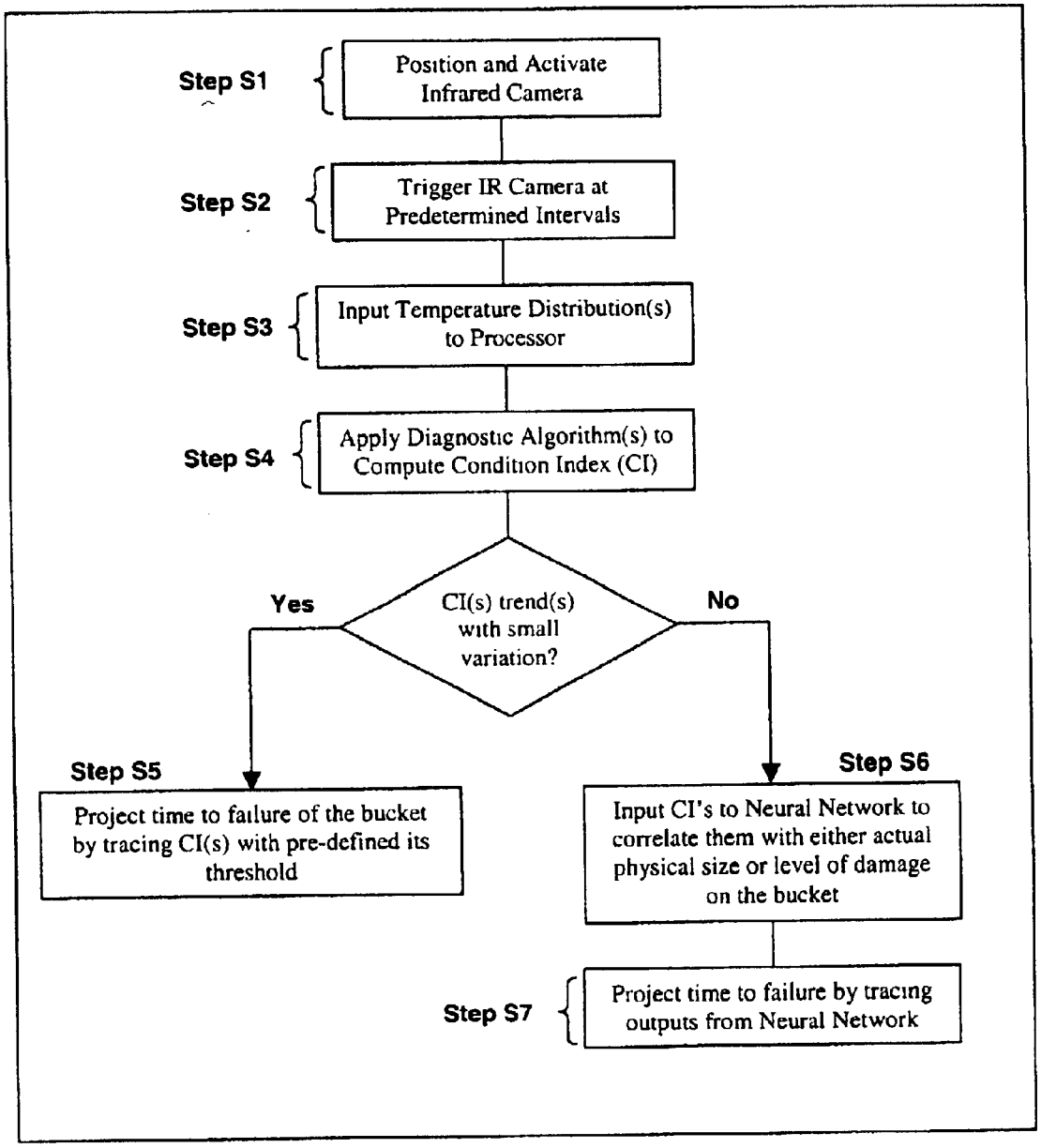
Figure 2. – Flow chart of bucket health monitoring and prognosis procedure

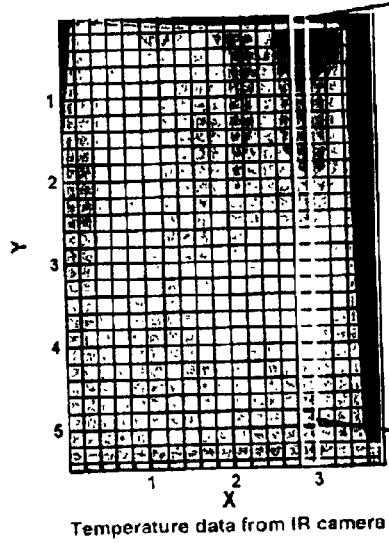
Figure 3. – Visual example of temperature distribution from IR camera.
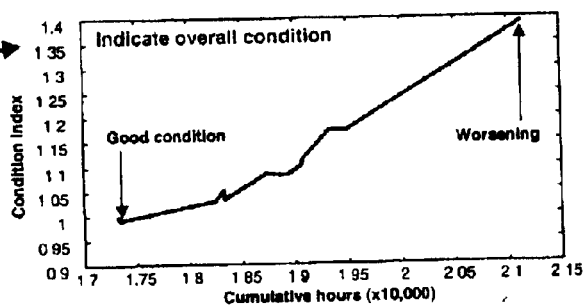
Figure 4. – Example of trending of condition index for overall condition of a bucket.
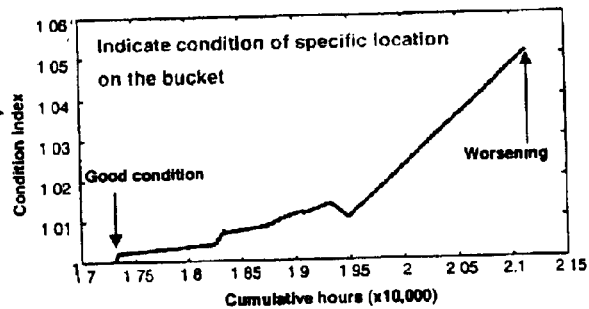
Figure 5. – Example of trending of condition index for a specific location on a bucket.

TURBINE BLADE (BUCKET) HEALTH MONITORING AND PROGNOSIS USING INFRARED CAMERA

BACKGROUND OF THE INVENTION

The present invention relates generally to turbine buckets and, more particularly, to a methodology to estimate bucket condition and its remaining service life utilizing an infrared camera (IR camera) that can capture the temperature distribution on the bucket. Properly integrated neural network and the utility of diagnostic techniques including signal and image processing techniques are used to estimate the bucket condition from the captured temperature distribution.

Buckets are critical gas turbine components. Unexpected failures of buckets almost always result in high maintenance costs. It is difficult to assess bucket condition and predict its remaining useful life while it is in service. The current analytical approach in estimating bucket life for temperature related failures requires absolute bucket metal temperature measurement. However, measuring the "absolute" temperature is not trivial due to many uncertainties including environment effects, sensor degradation, etc.

Optical pyrometers have been used to measure the temperatures of metal surfaces. Previous studies described the application of a high resolution turbine pyrometer to heavy duty gas turbines and compared the capability of long wavelength infrared pyrometers with short infrared wavelengths. Since the pyrometer, however, measures the temperature only from a small target spot (commonly 1 mm–26 mm), the current capability of the pyrometer is limited to the "line of sight (LOS)", the optical path of a turbine pyrometer. To compensate this limited capability, some researchers developed and evaluated a versatile high resolution pyrometer system and its application to radial turbine rotor temperature mapping. This approach, however, is not trivial and requires complex mechanical/electrical design. None of these studies attempted to assess the condition of the bucket that is in service.

Researchers have developed a number of diagnostic algorithms and applied them to vibration sensor output such as an accelerometer for machinery health monitoring. There is difficulty, however, in detecting the problem on the bucket surface in service using such vibration sensors. Moreover, none of the researchers attempted to apply the diagnostic concepts to optical sensors such as an IR camera and combine diagnostic techniques with image processing techniques in a turbine application.

BRIEF DESCRIPTION OF THE INVENTION

In an exemplary embodiment of the invention, a method of estimating turbine bucket oxidation condition includes the steps of (a) measuring, with an infrared camera, a temperature distribution on a surface of at least one rotating turbine bucket; and (b) determining a condition index based on the temperature distribution, the condition index reflecting at least one of an overall condition of a bucket or a specific location on the bucket.

In another exemplary embodiment of the invention, a method of estimating turbine bucket oxidation condition and predicting remaining useful bucket life during operation of a turbine is performed by processing a surface temperature distribution measured with an infrared camera of at least one rotating turbine bucket.

In yet another exemplary embodiment of the invention, a system estimates turbine bucket oxidation condition. The system includes an infrared camera that measures a surface temperature distribution of at least one rotating turbine bucket. A processor receives output from the infrared camera and determines a condition index based on the measured surface temperature distribution. The condition index reflects at least one of an overall condition of a bucket or a specific location on the bucket.

DETAILED DESCRIPTION OF THE INVENTION

Figure 1:
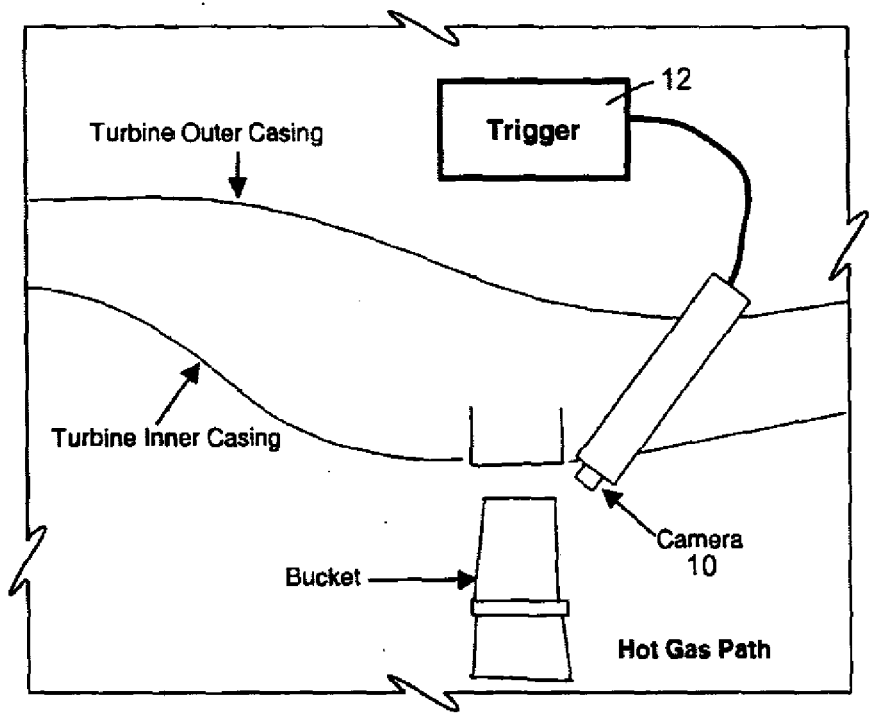
FIG. 1 is a schematic illustration showing an infrared camera capturing the temperature distribution on turbine blade surfaces during operation of the turbine.

As noted above, the current analytical approach for estimating bucket life for temperature related failures requires absolute bucket metal temperature measurement. The present invention, in contrast, does not require such absolute temperature measurement to estimate the bucket condition. Rather, with reference to FIG. 1, utilizing an infrared camera 10, a diagnostic algorithm can normalize the temperature readings from the infrared camera 10, which results in taking either the relative temperature distribution on the bucket surface or its profile (signature) as input. A known neural network technique can be incorporated with the outputs from the diagnostic algorithms.

Figure 2:
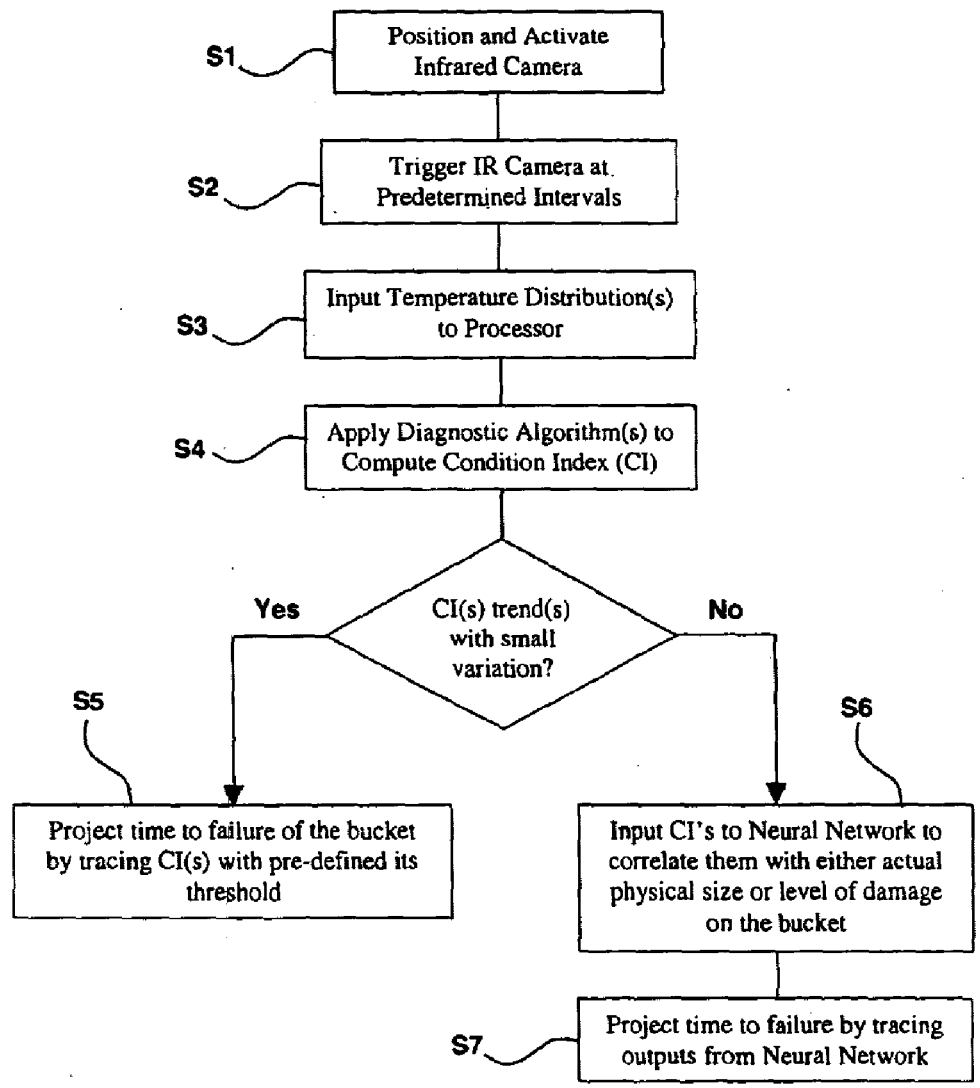
FIG. 2 is a flow diagram illustrating the methodology carried out by the system of the present invention.

With reference to FIG. 2, the infrared camera 10 is first positioned to capture images of the turbine buckets and activate it (step S1).

Figure 3:
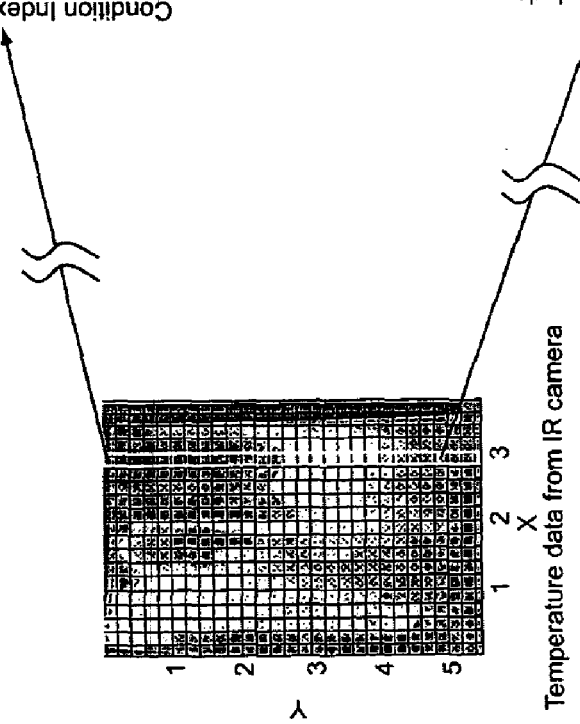
FIG. 3 is an exemplary image from the infrared camera.

The IR camera 10, as shown in FIG. 3, can capture the temperature distribution of a turbine blade (bucket) surface in two dimensions (i.e., whole surface of the bucket, not like the line of sight to which the pyrometer is limited). Since the frame rate of IR cameras is typically not fast enough to capture the rotating blade at high speeds (e.g., 3000–3600 rpm), a triggering mechanism 12 is coupled with the IR camera 10 to capture the fast rotating buckets (see FIG. 1). The triggering mechanism 12 uses a once-per-revolution signal from the turbine rotor to electrically trigger the IR camera 10. The common integration time (electronic shutter speed) of commercially available IR cameras ranges from 500 nsec to 33 $\mu$sec, which depends on its resolution and the type of detector. In addition, a time delay-switch will be used to give desired time delay to the triggering device 12 at every revolution of the turbine rotor, which enables capturing temperature distributions for the whole bucket set.

That is, the IR camera 10 is triggered at predetermined intervals based on a rotating speed of the turbine buckets (step S2). The predetermined intervals are set to measure the temperature distribution of one bucket per revolution in sequence, such that the predetermined intervals equal a time for one bucket revolution plus a distance between adjacent buckets. For example, one turbine stage typically includes ninety-two buckets. The predetermined interval may be set such that the IR camera is triggered for the first bucket, then after a full revolution of the bucket plus the distance between the first and second bucket, the IR camera 10 is triggered again, thus capturing the temperature distribution of the second bucket, and so on.

Given the temperature distribution and its signature input to a processor (step S3), diagnostic algorithms (including signal and image processing techniques) are used to produce a Condition Index (CI), which reflects either the overall condition of the bucket surface or the condition of specific location on the bucket surface, depending upon which diagnostic algorithm is applied (step S4). Therefore, local defects (e.g., oxidation and spallation) can show up as aberrations at the location on the bucket surface where the defect occurs. The Condition Index is used as an indicator for the bucket condition. Diagnostic algorithms can include a number of existing signal processing techniques, or statistical equations. For example, 'Root-Mean-Square' (RMS) which describes the general intensity of the vibration data can be used to reflect the overall condition of individual bucket; 'Kurtosis' which is the well known fourth statistical moment of the signal can measure the overall impulsiveness of the signal; and 'Energy Operator' (Maragos, et. Al., 1993)[1] which has been used to demodulate an amplitude and frequency modulated signal in speech analysis can be used to reflect the local condition of specific location on the bucket surface. All, but not limited to, these algorithms can use either temperature profile or just direct measurement from the IR camera 10 as inputs. Defects (e.g., oxidation and spallation) occurring at the particular location on the bucket surface will produce different CI's comparing with those generated from good (no oxidation) buckets. If the CI's are monotonically increasing or decreasing as oxidation on the bucket surface deteriorates, these values can be used to project time-to-failure of the bucket by tracing them (step S5). Using a neural network technique, this index can be correlated with either the actual physical size (measurement) or level of damage on the bucket surface (step S6). Tracing outputs from the neural network can be used to project time-to-failure of the bucket (step S7).

[1] Maragos, P., Kaiser, F., and Quatieri, T. F., 1993, "On Amplitude and Frequency Demodulation Using Energy Operator," IEEE Transaction on Signal Processing, Vol. 41, No. 4, pp. 1532–1550.

Figure 4:
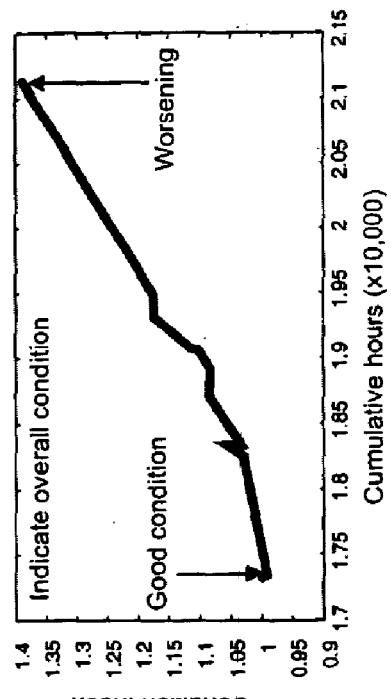
FIG. 4 is a graph showing a bucket condition index over time for an overall condition.
Figure 5:
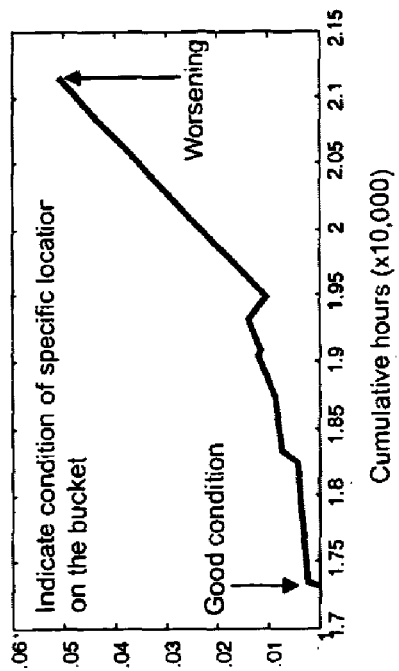
FIG. 5 is a graph showing the condition index over time for a specific location on the bucket.

FIG. 3 is an exemplary temperature distribution output with the IR camera 10. FIG. 4 is a graph showing an increasing condition index over time for an overall condition of a particular bucket. FIG. 5 shows an increasing condition index for a specific location on the bucket. In each case, trending these condition indices or correlating these condition indices with inspection results (measurement) can be established to predict remaining life of the bucket, which can then be used to optimize maintenance intervals, time-to-inspect etc.

With the methodology of the present invention, bucket condition can be estimated during operation using an infrared camera. By tracing the bucket condition over the gas turbine operating hours, maintenance actions or plans can be optimized, and premature failure of the buckets due to defects including oxidation and spallation can be prevented, resulting in reduced maintenance costs and increased safety margins.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of estimating turbine bucket oxidation condition comprising:
   (a) measuring, with an infrared camera, a temperature distribution on a surface of at least one rotating turbine bucket;
   (b) determining a condition index based on the temperature distribution, the condition index reflecting at least one of an overall oxidation condition of a bucket and an oxidation condition of a specific location on the bucket; and
   (c) estimating turbine bucket oxidation condition based on the condition index,
   wherein step (a) is practiced by triggering the infrared camera at predetermined intervals based on a rotating speed of the at least one rotating turbine bucket.

2. A method according to claim 1, further comprising (c) determining a bucket oxidation amount according to a comparison with known inspection data.

3. A method according to claim 2, wherein step (c) is practiced by establishing a neural network and defining a damage level including oxidation and spallation of a turbine bucket determined to have at least one defect.

4. A method according to claim 3, further comprising determining remaining bucket life via the neural network according to the bucket oxidation amount.

5. A method according to claim 1, wherein step (a) is practiced by measuring the temperature distribution on respective surfaces of a plurality of rotating turbine buckets, and wherein the predetermined intervals are set to measure the temperature distribution of one bucket per revolution.

6. A method according to claim 5, wherein the predetermined intervals are set to measure the temperature distribution of one bucket per revolution in sequence, such that the predetermined intervals equal a time for one bucket revolution plus a distance between adjacent buckets.

7. A system for estimating turbine bucket oxidation condition comprising:
   an infrared camera that measures a surface temperature distribution of at least one rotating turbine bucket;
   a triggering mechanism coupled with the infrared camera, the triggering mechanism triggering the infrared camera at predetermined intervals based on a rotating speed of the at least one rotating turbine bucket; and
   a processor receiving output from the infrared camera, the processor determining a condition index based on the measured surface temperature distribution, wherein the condition index reflects at least one of an overall oxidation condition of a bucket and an oxidation condition of a specific location on the bucket.

* * * * *

UNITED STATES PATENT AND TRADEMARK OFFICE
CERTIFICATE OF CORRECTION

PATENT NO.    : 6,796,709 B2
DATED         : September 28, 2004
INVENTOR(S)   : Choi It is certified that error appears in the above-identified patent and that said Letters Patent is hereby corrected as shown below:

Drawings,
Delete Figures 1-5 in the issued patent and insert therefor the attached three (3) sheets of formal drawings containing Figures 1-5.

Signed and Sealed this

Fourteenth Day of June, 2005

JON W. DUDAS
*Director of the United States Patent and Trademark Office*